United States Patent
Sallinen et al.

(10) Patent No.: US 11,607,571 B2
(45) Date of Patent: Mar. 21, 2023

(54) CONNECTION ARRANGEMENT FOR A TRAMPOLINE AND A TRAMPOLINE

(71) Applicant: Acon Finland Oy Ltd, Oulu (FI)

(72) Inventors: Tuomas Sallinen, Oulu (FI); Jari Kiviniemi, Siikajoki (FI); Timo Luhtaniemi, Oulu (FI)

(73) Assignee: ACON FINLAND OY LTD, Oulu (FI)

( * ) Notice: Subject to any disclaimer, the term of this patent is extended or adjusted under 35 U.S.C. 154(b) by 0 days.

(21) Appl. No.: 17/618,640

(22) PCT Filed: Jun. 9, 2020

(86) PCT No.: PCT/FI2020/000010
§ 371 (c)(1),
(2) Date: Dec. 13, 2021

(87) PCT Pub. No.: WO2020/254717
PCT Pub. Date: Dec. 24, 2020

(65) Prior Publication Data
US 2022/0233902 A1  Jul. 28, 2022

(30) Foreign Application Priority Data

Jun. 17, 2019  (FI) ...................................... 20197092

(51) Int. Cl.
*A63B 5/11* (2006.01)
*A63B 21/055* (2006.01)
(Continued)

(52) U.S. Cl.
CPC ............ *A63B 5/11* (2013.01); *A63B 21/0557* (2013.01); *F16B 2/08* (2013.01); *F16B 5/0692* (2013.01)

(58) Field of Classification Search
CPC ......... A63B 5/11; A63B 21/0557; F16B 2/08; F16B 5/0692; F16G 11/12
(Continued)

(56) References Cited

U.S. PATENT DOCUMENTS 9,289,637 B2 *  3/2016  Publicover ............... A63B 5/11
10,532,238 B2 *  1/2020  Publicover ............... A63B 5/11
(Continued)

FOREIGN PATENT DOCUMENTS

| CN | 205796351 U | 12/2016 |
|---|---|---|
| EP | 2477703 | 7/2012 |
| WO | WO2017/157867 | 9/2017 |

OTHER PUBLICATIONS

English Language Translation of WO 2017/157867 A1, Sep. 12, 2021.
(Continued)

*Primary Examiner* — Anita M King
(74) *Attorney, Agent, or Firm* — Jacob Eisenberg

(57) ABSTRACT

In this disclosure a connection arrangement for a trampoline is set out, the arrangement including a mat and a frame. The connection arrangement includes a cord and a security piece, which includes a receiving part and a cord holding part. The cord holding part is configured to receive both ends of the cord and thus forming a loop that includes the cord and the cord holding part. The receiving part receives the cord holding part and one end of the loop through an opening. The loop is configured to wrap around some horizontal part of the frame of the trampoline when the connection arrangement is fitted onto the frame.

15 Claims, 8 Drawing Sheets

(51) Int. Cl.
*F16B 2/08* (2006.01)
*F16B 5/06* (2006.01)

(58) Field of Classification Search
USPC .......................................................... 482/27
See application file for complete search history.

(56) References Cited

U.S. PATENT DOCUMENTS

| | | |
|---|---|---|
| 11,167,165 B2* | 11/2021 | Publicover ......... A63B 21/0557 |
| 2013/0316876 A1 | 11/2013 | Publicover |
| 2019/0120325 A1 | 4/2019 | Bisang et al. |
| 2019/0143164 A1* | 5/2019 | Bisang ................. F16B 5/0692 |
| | | 482/27 |
| 2019/0154115 A1* | 5/2019 | Mehr ................. A63B 21/0555 |

OTHER PUBLICATIONS

English Language Translation of CN205796351U, Dec. 13, 2021.
OEE workproduct—Office Action for International Application PCT/FI2020/000010 dated Jan. 14, 2020.

\* cited by examiner

CONNECTION ARRANGEMENT FOR A TRAMPOLINE AND A TRAMPOLINE

CROSS REFERENCE TO RELATED APPLICATIONS

This is a national phase application of international patent application PCT/FI2020/000010, filed on Jun. 9, 2020, which is claims the benefit of priority Finnish patent application 20197092, filed on Jun. 17, 2019, the content of both of which is hereby incorporated by reference.

BACKGROUND OF THE INVENTION

The present disclosure relates to a connection arrangement for a trampoline comprising a mat and a frame, and the connection arrangement serves to connect the mat to the frame, and the connection arrangement comprises an elastic cord having a first end of the cord and a second end of the cord, and the connection arrangement further comprises two parts: a cord holding part and a receiving part. The invention relates also to a trampoline comprising a mat and a frame.

Trampolines are commonly used in outdoor and indoor activities. Trampolines comprise a frame structure and a mat connected to the frame structure with spring elements such as springs or similar. Outdoor trampolines are quite big and robust in structure.

The mats are connected to the frame structure with spring elements of varied types or other types of elastic elements, for example rubber cables, bands or cords, pre-stressed carbon or spring steel strips. In addition to the vertically acting forces, considerable horizontal forces or transverse forces can also act on the frame structure. It emerges from the abovementioned facts that trampolines require a solid frame structure which can withstand many kinds of torsion forces.

In addition to the outdoor trampolines (it must be noted that outdoor trampolines can be used indoors if the facility is suitable, i.e., large enough), there are so-called mini or fitness trampolines. Mini trampolines are customarily provided with a diameter of 100 centimetres to 150 centimetres. Their rebounding mat is typically positioned 20 centimetres to 35 centimetres above the ground. Devices of this type are used for obtaining positive impulses for improving personal health, for relaxation and for physiotherapeutic exercises. The type of use can be specified as rocking, swinging and jumping, i.e., the aim of mini trampolines is not to perform high jumps or bounces. The mat plane is configured for maximum jump heights of 10 centimetres to 40 centimetres. The mini trampolines are clearly smaller structures than the conventional outdoor trampolines.

Mini trampolines are generally used at home or in purpose-built rooms, such as gyms. They are often frequently erected or moved on a daily basis. This requirement implies light weight and nevertheless stable structures. The weight of mini trampolines usually does not exceed 10 to 15 kilograms. Mini trampolines are practically always delivered in the assembled state.

With these mini trampolines, a distinction is made between trampolines with a metal spring suspension (which practically all outdoor trampolines employ) and an elastic strap ring suspension. In the case of a metal spring suspension, the jumping mat is secured to the frame by means of helical metal springs. Such a suspension allows for considerable acceleration forces and is therefore suitable, in particular, for sports training with high demands on the cardiovascular system or gaining high jumps. In the case of an elastic strap ring suspension, one or more elastic straps or strap sections are used, which connect the jumping mat to the frame. The superior elasticity of such a fastening method allows softer deceleration of the body and is thus better suited for those who suffer from joint and back problems, those who are undergoing in rehabilitation, for relaxation and combating stress, for children and for all kind of fitness purposes.

The elastic suspension comprises members or elements that may be any kind of rope or cord with elastic qualities, permitting the spring members to stretch when pulled or compress when pushed. The spring members may be any type of elastic cords, or they may be made of a natural or synthetic rubber or some other artificial elastic material or include the type of cords known as bungee or shock cords, which are composed of one or more elastic strands forming a core and are commonly covered by a sheath of woven material such as cotton, polypropylene, or other suitable material.

Patent publication U.S. Pat. No. 8,038,580 discloses a hook element for a trampoline and more particularly for a mini trampoline, for connecting the mat to the frame of the trampoline. Its hook element comprises two receiving sections for loop-like cord. This kind of structure is however quite prone to cord movements during the use of the trampoline. Also, the hook element is by design quite thick, and it requires some special covering arrangements.

Patent publication U.S. Pat. No. 9,289,637 discloses several versions of a connection element for a rebounder, i.e., a mini trampoline, for connecting the mat to the frame of the trampoline. They are all quite complicated structures, which makes replacing cords quite challenging. Patent publication US2019120325 discloses an elastic element for securing a jump mat to a trampoline frame. The elastic element includes a flexible cord element and two separate terminating elements. However, the structure contains fragile parts. Patent publication EP2477703 discloses a trampoline with a frame has a rebounding mat that is tensioned to the frame with a plurality of cordlike linear elastic members, and patent publication CN205796351 discloses a trampoline comprising connectors being made up of hook and stretch cord. Both trampoline structures have connectors for connecting the mat to the frame, which connectors are complicated, and thus hard to use and prone to damage.

There is a clear need for a simple and reliable connection arrangement for a mini trampoline. Also, the maintaining process should be easy and fast.

BRIEF SUMMARY OF THE INVENTION

An object of the invention is a solution that can significantly reduce the disadvantages and drawbacks of the prior art. In particular, the object of the invention is a solution where a connection arrangement is reliable and easy to use and is especially suitable for mini trampolines.

The objects of the invention are attained with a device that is characterised by what is stated in the independent patent claims. Some advantageous embodiments of the invention are disclosed in the dependent claims.

The invention is a connection arrangement for a trampoline comprising a mat and a frame. The connection arrangement comprises a cord and a security piece, which is formed in two parts: a receiving part and a cord holding part. The cord holding part is configured to receive both ends of the cord forming a loop. The receiving part receives the cord holding part and one end of the loop through an opening.

The loop wraps around some horizontal part of the frame of the trampoline when the connection arrangement is connected to the frame.

When reference is made in the text to the upper or the lower parts or respective directions such as down or up, a situation is described in which the trampoline according to the invention is in use. Also, when reference is made to the vertical or horizontal directions or surfaces, the trampoline is placed similarly.

In one embodiment of the invention is a connection arrangement for a trampoline comprising a mat and a frame, and the connection arrangement serves to connect the mat to the frame, and the connection arrangement comprises an elastic cord having a first end of the cord and a second end of the cord, and the connection arrangement further comprises two parts: a cord holding part and a receiving part. In one advantageous embodiment of the invention, the cord holding part comprises a first end of the cord holding part, a second end of the cord holding part, a first surface and a second surface and sides of the cord holding part. The receiving part comprises a first end of the receiving part, a second end of the receiving part, an upper surface, a bottom surface, a receiving space for receiving the cord holding part and the sides of the receiving part, which sides are open to the receiving space. On the bottom surface is an opening to the receiving space and the opening is configured to extend from the second end of the receiving part towards the first end of the receiving part. The cord holding part further comprises two holes: a first hole and a second hole, and the holes extend from the first end of the cord holding part towards the second end of the cord holding part. In some embodiments the holes go through the cord holding part, and in some embodiments the lengths of the holes are less than the length of the cord holding part in the direction of the longitudinal axis of the holes. The elastic cord is configured in such a way that the first end of the cord is in or goes through the first hole and the second end of the cord is in or goes through the second hole and the rest of the cord forms a loop at the first side of the cord holding part. The receiving space is configured to extend across the bottom surface, and the cord holding part is configured to slide at least partly over the bottom surface in such a way that the first end of the cord holding part is towards the first end of the receiving part, the first surface is towards the upper surface, the second surface is towards the bottom surface and there is room for the cord in the receiving space. When the connection arrangement is in use, one end of the loop is configured to wrap around the frame and placed in the receiving space. The feature provides a space for the cord to expand and shrink evenly, minimizing torque forces affecting the structures of the connection arrangement or the frame of the trampoline. Furthermore, it allows a flatter and more compact connection arrangement. Because the ends of the cord are fixed to the connection arrangement on the same horizontal level, the torque forces in the vertical direction can be minimized. In some embodiments, the distance from the first end of the receiving part to the second end of the receiving part is longer than the distance from the first end of the cord holding part to the second end of the cord holding part, i.e. the receiving part is longer than the cord holding part.

In one embodiment of the connection arrangement, the opening extends from one side of the receiving part to another side of the receiving part. This feature makes the opening easier to reach.

In a second embodiment of the connection arrangement, when the connection arrangement is in use, the upper surface is facing upward and the bottom surface is facing downward in relation to the trampoline. When the opening is facing downward, the connection arrangement has a smooth unbroken surface, which improves safety because there are no holes or protrusions that may injure the user.

In a third embodiment of the connection arrangement, the length of the opening in direction of the longitudinal axis of the receiving part, i.e. in the direction from the first end of the receiving part to the second end of the receiving part, is the length of the cord holding part from the first end of the cord holding part to the second end of the cord holding part or larger. This feature allows a faster assembly process because there is less need for rotating the cord holding part when placing it in the receiving space.

In a fourth embodiment of the connection arrangement, in the receiving space on the opposite side of the opening is a guidance wall that is parallel to the longitudinal axis of the receiving part, and in the cord holding part is a guidance groove for receiving the guidance wall when the cord holding part is in the receiving space. This feature places the cord holding part in the right position when it is pushed into the receiving space.

In a fifth embodiment of the connection arrangement, between the bottom surface and the upper surface at the first end of the receiving part or near it, is a wall-like stability element parallel to the longitudinal axis of the receiving part, and in the first end of the cord holding part is a stability groove (i.e. the stability groove is configured to open into the first end of the cord holding part) extending from the first surface of the cord holding part to the second surface of the cord holding part. The stability element is configured to fit into the stability groove. This feature keeps the cord holding part in the right position when it is placed inside the receiving space.

In a sixth embodiment of the connection arrangement, in the first end of the receiving part is a first cord recess and a second cord recess and the first cord recess is open to the one side of the receiving part and the second cord recess is open to another side of the receiving part, and when the connection arrangement is in use, parts of the cord are in said recesses. This feature keeps the cord as straight as possible, thus eliminating sharp corners which may damage or weaken the cord in some cases.

In a seventh embodiment of the connection arrangement, on the second surface of the cord holding part at the second end of the cord holding part is a flat lip extension that forms a groove between the lip extension and the upper surface when the connection arrangement is in use. This feature allows the opening to be enlarged because the bottom surface does not need to extend as far towards the second end of the receiving part to form a groove for the cord. Therefore, the placement of the cord holding part is faster and easier to perform.

In an eight embodiment of the connection arrangement, the cord holding part further comprises a first clamping arrangement and a second clamping arrangement, and the clamping arrangements are configured to clamp the cord in the first hole and in the second hole when the connection arrangement is in use. In a ninth embodiment of the connection arrangement, the first clamping arrangement and the second clamping arrangement comprise extensions on the first surface of the cord holding part and on the second surface of the cord holding part, and when the cord holding part is at least partly between the bottom surface and the upper surface, said surfaces press the extensions inside the cord holding part, thus pressing the cord firmer into the holes. These features improve the locking of the cord in the cord holding part.

In a tenth embodiment of the connection arrangement, the thickness of the first end of the cord holding part is less than the thickness of the second end of the cord holding part. This feature allows faster placement of the cord holding part.

In an eleventh embodiment of the connection arrangement, the first end of the receiving part is higher than the second end of the receiving part. This feature increases the size of the opening.

In a twelfth embodiment of the connection arrangement, in the second end of the receiving part is an arrangement for fixing the mat to the receiving part.

In a thirteenth embodiment of the connection arrangement, the second end of the receiving part is wider than the first end of the receiving part. This feature allows for more secure fixing of the mat. Also, it reduces the sideways movement of the connection arrangement when it is in use in the trampoline.

In one embodiment of the invention is a trampoline comprising a mat and a frame. In one advantageous embodiment the trampoline further comprises a multitude of connection arrangements as described earlier for connecting the mat to the frame.

It is an advantage of the invention that it provides a connection arrangement that is easy to maintain because the cords are replaceable. Also, the connection arrangement keeps the cord in place. The cord does not slide or move during use. The structure of the connection arrangement is flat and low in profile, so it does not form uncomfortable or possibly harmful bulges at the borders of the mat. Also, because the structure is compact, it does not gather dirt and it is quite easy to clean, which increases the durability and life span of the connection arrangement. The parts of the connection arrangement are simple and thus easy to manufacture, so the manufacturing costs can be kept low. Because the cords can be easily replaced, the connection arrangement produces controllable bouncing effects, so that manufacturing different trampoline types or classes (for example user's weight or sport type the trampoline is for) is fast and cost-efficient.

Using the invention significantly improves the assembly process. No additional fixing means are needed, such as pins, screws, bolts, latches, locking arrangements or some such, because the structure in itself fixes the parts together. It also spreads stress forces evenly in the connection arrangement and the trampoline frame to which the connection arrangement is attached. The invention also removes the need for a joint in the cord to form a cord loop.

One advantage of the invention is that it is quite efficient for mini and fitness trampolines.

The invention also provides a trampoline that uses a multitude of connection arrangements according to the invention, which improves safety and still lowers manufacturing costs. The structure according to the invention is more rigid and more durable than known techniques.

BRIEF DESCRIPTION OF THE DRAWINGS

Further advantages features and details of the various embodiments of this disclosure will become apparent from 11 the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure In the following, the invention is described in detail. The description refers to the accompanying drawings, in which.

DETAILED DESCRIPTIONS OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination The embodiments in the following description are given as examples only and someone skilled in the art can carry out the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

Figure 1:
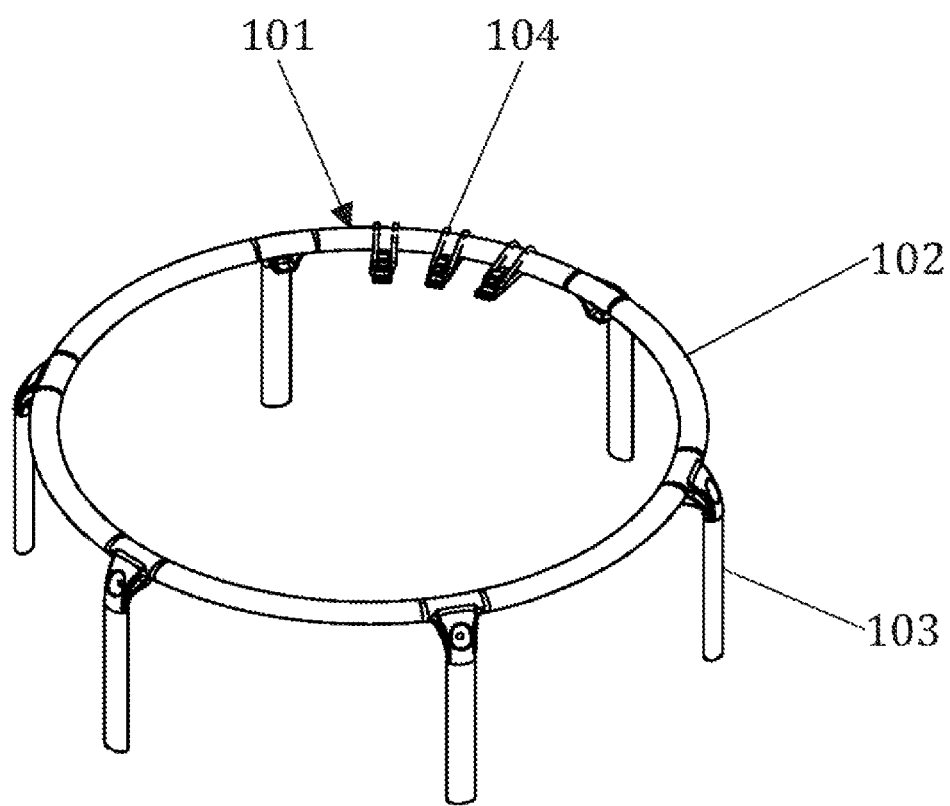
FIG. 1 depicts an example of a trampoline according to an embodiment.

FIG. 1 depicts an embodiment of a trampoline 100. The trampoline comprises a frame 101 and a mat (not shown in the figure for the sake of clarity). The frame comprises a ringlike rim structure 102 and leg arrangements 103. The mat is connected to the frame and, more precisely, to the rim structure by a multitude of connection arrangements 104 (for the sake of clarity, only three are shown in the figure). Naturally, the rim structure may be shaped differently. It may be for example oval or rectangular in shape. The rim structure consist of elongated pipes or poles. In some embodiments the rim structure is manufactured as a one piece. It can be circular or another suitable shape for a trampoline.

Figure 2:
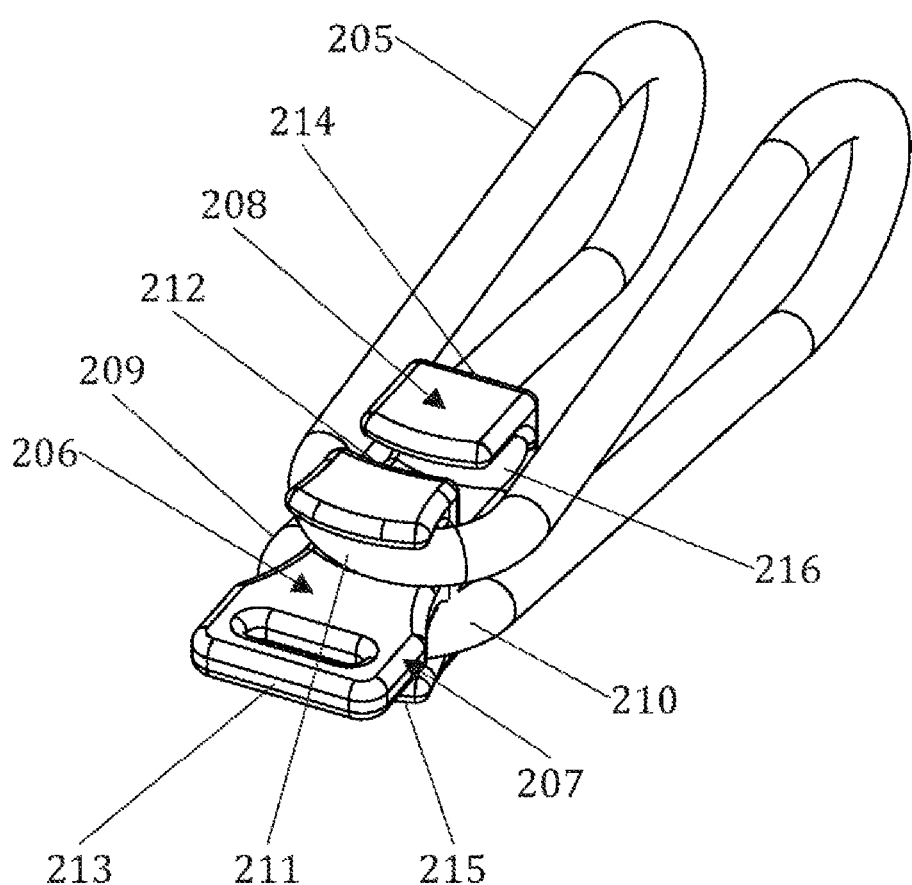
FIG. 2 depicts an example of a connection arrangement according to an embodiment.

FIG. 2 depicts an example of a connection arrangement 204 according to an embodiment. The connection arrangement connects to the mat, stretching it outward, toward the frame of the trampoline. The connection arrangement comprises an elastic cord 205 and a securing piece 206. The securing piece keeps the elastic cord in place during use of the trampoline and fixes the mat to the connection arrangement.

The securing piece 206 comprises two parts: a cord holding part 207 and a receiving part 208. The elastic cord 205 comprises a first end 209 of the cord and a second end 210 of the cord. The cord holding part comprises an arrangement for holding both ends of the cord. This arrangement is a pair of holes in the cord holding part. In some embodiments, the holes go through the cord holding part from the first end of the cord holding part to the second end of the cord holding part. In some embodiments the holes do not pierce the cord holding part, but they stop at the bottom of the hole. The cord therefore forms a loop having a first end 211 of the loop and the second end of the loop. The second end of the loop is the cord holding part. In FIG. 2, the ends of the cord are moved a somewhat outward from the cord holding part to make the functioning of the connection arrangement 204 clearer. The securing piece has an operational position in which the cord holding part 207 and the receiving part 208 are attached tightly to each other. In the operational position, the securing piece is a relatively solid structure and the parts of the securing piece do not easily move in relation to each other, but the movements of securing piece occur mainly simultaneously. This is even more evident when the connection arrangement 204 is in use, i.e., fitted onto the trampoline. The tension between the frame of the trampoline and the mat keeps the parts of the securing piece tightly pressed against each other. In that case, the securing piece behaves practically as a single object.

The cord holding part 207 comprises a first end of the cord holding part 212 and a second 213 end of the cord holding part. The ends of the cord enter into the cord holding part from the first end of the cord holding part. The receiving part 208 comprises a first end 214 of the receiving part and a second end 215 of the receiving part and a receiving space 216 for the cord holding part. The cord holding part and the receiving part are configured in such a way that the cord holding part fits into the receiving space to form the securing piece 206. The distance from the first end of the receiving part to the second end of the receiving part is longer than the distance from the first end of the cord holding part to the second end of the cord holding part, i.e. the receiving part is longer than the cord holding part.

In FIG. 2, the cord holding part 207 is ready to be placed into the receiving part 208. The first end 211 of the loop is turned in such a way that the first end is attached inside the cord holding part. When the connection arrangement 204 is ready for use, the loop is wrapped around the frame of the trampoline and more particularly, around the rim structure. When it is wrapped around the rim structure, the loop can go over or underneath the rim structure. When the cord holding part and the receiving part are in the operational position, i.e. the cord holding part is tightly inside the receiving space 216, the cord holding part and the receiving part are configured in such a way that the first end of the loop is securely attached to the securing piece 206 when the loop part of the cord 205 is attaching the connection arrangement 204 to the frame.

When the connection arrangement 204 is placed in the trampoline, the first end 214 of the receiving part is toward the rim structure and the second end 215 of the receiving part is toward the mat. The second end of the receiving part is fixed to the mat. This implemented by some known technique. The first end of the cord holding part 212 is toward the rim structure and the second 213 end of the cord holding part is toward the mat. At the same time, the first end of the cord holding part is toward the first end of the receiving part and the second end of the cord holding part is toward the second end of the receiving part. In that case, the cord holding part is shorter than the receiving part. It must be noted that the lengths and widths of the parts of the securing piece 206 are relative to the longitudinal axis of the connection arrangement. The longitudinal axis of the connection arrangement is parallel to the direction from the edge of the mat to the frame of the trampoline, when the connection arrangement is placed in the trampoline.

In FIG. 2 the connection arrangement 204 is seen from below. This means that when the connection arrangement is in use, i.e., placed in the trampoline, the parts of the securing piece 206 that are now visible, will be facing downward in relation to the trampoline.

Figure 3:
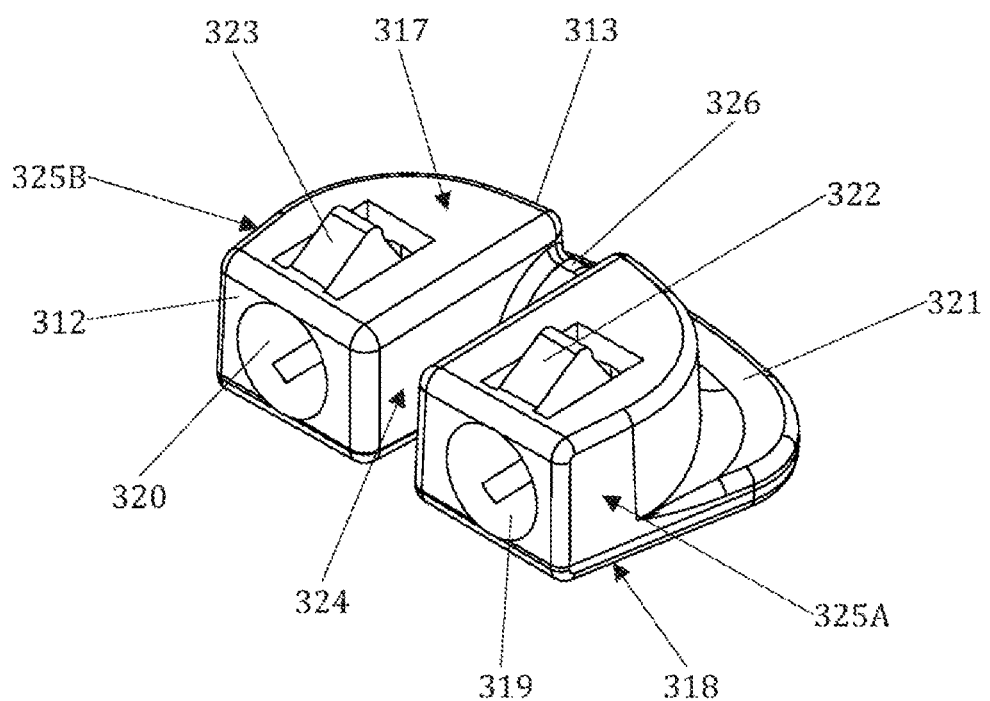
FIG. 3 depicts an example of a cord holding part according to an embodiment

FIG. 3 depicts an example of a cord holding part 307 according to an embodiment. The cord holding part comprises a first end 312 of the cord holding part, a second end 313 of the cord holding part, a first surface 317 and a second surface 318 and sides 325A and 325B of the cord holding part. The cord holding part further comprises a first hole 319, a second hole 320, a lip extension 321, a first clamping arrangement 322, a second clamping arrangement 323, a stability groove 324 and a guidance groove 326. The cord holding part has a longitudinal axis that is between the first end of the cord holding part and the second end of the cord holding part. This longitudinal axis is parallel to the longitudinal axis of the connection arrangement when the cord holding part in an operational position.

The first hole 319 and the second hole 320 are configured to receive the ends of a cord having a first end of cord and a second end of a cord. The first end of the cord is placed in the first hole and the second end of the cord is placed in the second hole. The holes are parallel to the longitudinal axis of the cord holding part 307. The holes reach from the first end 312 of the cord holding part to bottoms of the holes in the cord holding part, i.e. they do not go through the cord holding part in this embodiment. In some embodiments, the longitudinal axis of the holes may be slightly off the longitudinal axis of the cord holding part. The holes are configured in such a way that when the cord is placed in the hole, the walls of the holes do not exert additional pressure onto the cord, which may weaken or even damage the cord. There is some arrangement for locking the ends of the cord into the holes at least when the connection arrangement is in use. In this example, the first clamping arrangement 322 and the second clamping arrangement 323 are configured to hold the ends of the cord. The clamping arrangements comprise a protrusion that extends into the hole through the wall the hole. On the first surface is a wedge-like structure that is connected to the protrusion. The protrusion is configured to allow the cord to move when it is moving in the direction from the first end of the cord holding part toward the second end of the cord holding part. When the cord is moving in the opposite direction, the protrusion grasps the cord and prevents movement of the cord. The cord can be removed from the hole with sufficient force or by lifting the wedge and at the same time lifting the protrusion from the hole, thus releasing the cord. When the cord holding part 307 is placed into the operational position, i.e., into the receiving space, the inner surfaces of the receiving part (and its receiving space surfaces) press against the wedge-like structure and the protrusion is pushed deeper into the hole, practically preventing all movements of the cord inside the hole. The wedge-like structure is released when the cord holding part is moved away from the operational position. In this embodiment, the first clamping arrangement 322 comprises the wedgelike structures both on the first surface and the second surface, and there are two opposing protrusions on walls of the first hole. These protrusions are configured to clamp the cord between them. The second clamping arrangement 323 is implemented in in the same manner as the second hole. The positions of the protrusions in relation to the bottoms of the holes are chosen in such a way that there is sufficient space between the protrusions and the bottoms of the holes for the ends of the cords, so that the clamping arrangements operate unhindered.

The line between the centrepoints of the cross-sections of the first hole 319 and the second hole 320 is parallel to the first surface 317 and the second surface 318. The holes are on the same horizontal level when the connection arrangement is in use. This reduces some torque forces.

The lip extension 321 is a flat structure on the second end 313 of the cord holding part. One surface of the lip extension is level with the second surface 318 of the cord holding part. The lip extension extends from one side 325A of the cord holding part to the other side 325b of the cord holding part. The lip extension is configured in such a way that when the cord holding part 307 is in the operational position, i.e. it is placed into the receiving space of the receiving part, a groove is formed for the cord and, more particularly, for the first end of the loop of the cord. The bottom of this groove is the second end of the cord holding part, and the walls of groove are the lip extension and the surface of receiving space inside the receiving part. The second end of the cord holding part, i.e. the surface that forms the bottom of the groove, is advantageously rounded to avoid sharp corners, which may cause wear and damage to the cord. The lip extension improves the placement and the hold on the first end of the loop, and thus the holding strength of the connection arrangement.

Between the first hole 319 and the second hole 320 is the stability groove 324. The stability groove extends from the first surface 317 to the second surface 318 and it is open toward the first end 312 of the cord holding part. The bottom of the stability groove is toward the second end 313 of the cord holding part. The receiving part has a corresponding structure: a stability element. When the cord holding part 307 is in the operational position, the stability element is configured to fit into the stability groove. This structure increases the solidity of the securing piece. The longitudinal axis of the cord holding part is parallel to the side walls of the stability groove.

On the first surface 317 is the guidance groove 326. It extends from the first end 312 of the cord holding part to the second end 313 of the cord holding part. The guidance groove is parallel to the longitudinal axis of the cord holding part. The guidance groove is configured to receive a corresponding structure in the receiving part: a guidance wall. The guidance wall and the guidance groove serve to assist the positioning and placement of the cord holding part 307 into the receiving part. When the guidance wall is at least partly inside the guidance groove, it guides the cord holding part into the right position and direction. In this embodiment the guidance groove is a continuation of the side of the stability groove 324 on the first surface.

Figure 4:
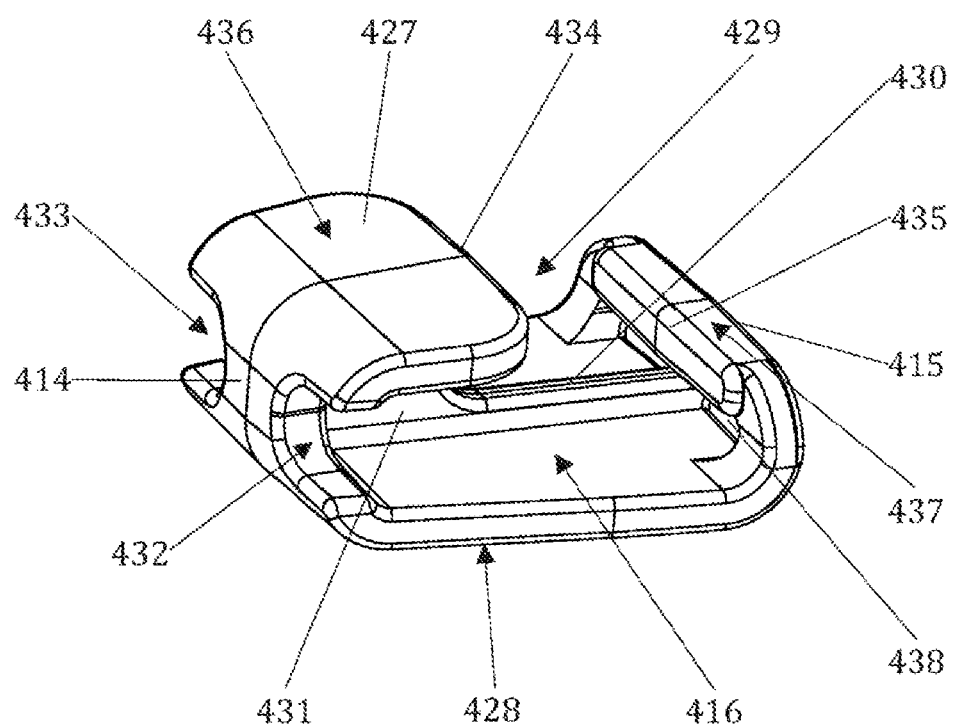
FIG. 4 depicts an example of a receiving part according to an embodiment as seen from the bottom.

FIG. 4 depicts an example of a receiving part 408 according to an embodiment. The receiving part comprises a first end 414 of the receiving part, a second end 415 of the receiving part, an upper surface 428, a bottom surface 427, a receiving space 416 for receiving a cord holding part, an opening 429 to the receiving space, and the sides of the receiving part. The sides of the receiving part are open, i.e., there are no physical sides, so they are not numbered. The receiving part further comprises a guidance wall 430, a stability element 431, a first cord recess 432 and a second cord recess 433.

The receiving space 416 is an open area inside of the receiving part 408. The cord holding part is configured to fit inside the receiving space in such a way that the cord and, more particularly, the first end of the loop, which loop is formed by attaching the ends of the cord into the cord holding part, can also be placed inside the receiving space, in addition to the cord holding part. The receiving space extends in the longitudinal direction (i.e., in a direction parallel to the longitudinal axis of the receiving part) from the first end 414 of the receiving part to the second end 415 of the receiving part. In the direction perpendicular to the longitudinal direction, the receiving space extends from one side of the receiving part to the other side of the receiving part. Because the receiving part does not have physical sides, the receiving space is open to toward both sides.

The bottom surface 427 is facing downward when the receiving part 408 and the cord holding part are joined to form a securing piece, and the securing piece is part of a connecting arrangement that is placed onto a trampoline. The upper surface 428 is facing upward in this situation. The upper surface extends in a continuous manner from the first end 414 of the receiving part to the second end 415 of the receiving part. It forms a surface of the receiving space 416. On the bottom surface is the opening 429, which is perpendicular to the longitudinal direction. The opening reaches from one side to the other side, i.e., the opening forms a discontinuity in the bottom surface and divides it into two distinct parts: a first part 436 and a second part 437. The first part is between the first end of the receiving part and the opening. The second part is between the opening and the second end of the receiving part. In some embodiments, there is only one part in the bottom surface, and that part is the first part. In that case, the opening extends to the second end of the receiving part.

The opening 429 has a first edge 434 and a second edge 435. The first edge is towards the first end 414 of the receiving part and the second edge is towards the second end 415 of the receiving part. The middle point of the opening, i.e., the point that is an equal distance away from the first edge and the second edge, is nearer to the second end of the receiving part than to the first end of the receiving part. The width of the opening, i.e., the distance between the first edge and the second edge, is approximately equal to the length of the cord holding part or more. The length of the bottom surface 427 from the first end 414 of the receiving part to the first edge is such that the cord holding part fits under the first part 436 of the bottom surface, and in that case the first part near the opening is configured to hold the cord. In embodiments, where the cord holding part comprises a lip extension, the lip extension extends into the opening when the cord holding part is in place. The lip extension forms a groove in the receiving space 416 for the cord. The lip extension is configured in such a way that the distance between the second edge and the lip extension is such that the cord can be placed into the receiving space when the cord holding part is in place.

At the second end 415 of the receiving part is a fixing arrangement 438 for fixing the mat of the trampoline into the receiving part 408. The arrangement can be implemented in various ways. In some embodiments the length of the fixing area, i.e., the distance between the outermost fixing points on the second end of the receiving part is longer than the distance between the centrepoints of the first hole and the second hole in the cord holding part. This was found to improve the stability of the connection arrangement when it is in use.

In the receiving space 416 surface, which is on the upper surface 428 (i.e., on the surface that opposes the opening 429) is the guidance wall 430. The guidance wall is a wall-like or rail-like structure that is positioned in the direction of the longitudinal axis of the receiving part 408. In this embodiment, the guidance wall is configured to extend from the first end 414 of the receiving part to the second end 415 of the receiving part. The cord holding part comprises a guidance groove that is configured to fit at least partly over the guidance wall when the cord holding part is in the right position and direction for placement into the receiving space in order to join the cord holding part and the receiving part to the securing piece. In addition to guiding the cord holding part during the assembly process, the guiding wall also keeps the parts of the securing piece together. The guidance wall also improves the stability of the receiving part. The guidance wall is situated between the first cord recess 432 and the second cord recess 433.

In the receiving space 416 surface, which is on the upper surface 428 at the first end 414 of the receiving part, is the stability element 431. The stability element is a wall-like or barrier-like structure extending from the upper surface 428 to the bottom surface 427. The stability element is positioned in the direction of the longitudinal axis of the receiving part 408. The cord holding part comprises a stability groove that is configured to fit over the stability element when the cord holding part is joined with the receiving part to form the securing piece. The stability element improves the solidity of the securing piece and effectively prevents the securing piece parts from moving when the connection arrangement is in use. The stability element also serves to support the first part 436 of the bottom surface. In this embodiment, the stability element and the guidance wall converge. The stability element is situated between the first cord recess 432 and the second cord recess 433.

The first cord recess 432 and the second cord recess 433 are at the first end 414 of the receiving part. The first cord recess is a U-shaped form at the first end of the receiving part, and the first cord recess is configured to open to one side of the receiving part. The second cord recess is formed in the same manner, and it is configured to open to the other side of the receiving part, opposite to that of the first cord recess. The first cord recess and the second cord recess are placed symmetrically. When the cord holding part is placed into the receiving space 416 and the securing piece is formed, the cord parts near the first end of the cord and the second end of the cord are in the first cord recess and the second cord recess. This allows the cord near the securing piece to run in the same directions as the cord inside the first hole and the second hole of the cord holding part. The cord recesses prevent sharp bends in the cord and thus improve the durability of the cord. Slight curvature in the walls of the recesses allows the opening angle of the loop to be changed.

Figure 5:
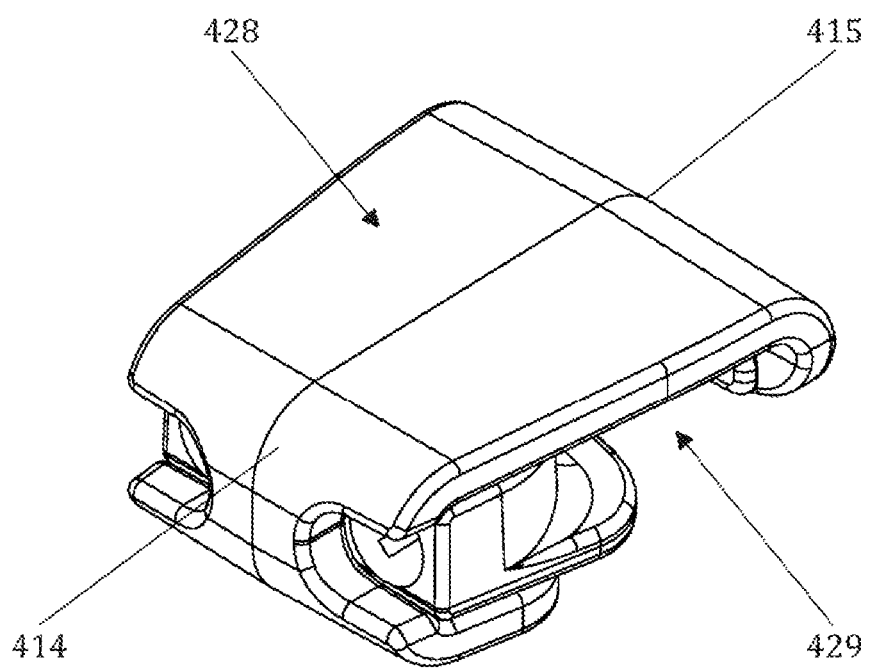
FIG. 5 depicts the receiving part presented in FIG. 4 as seen from the top.

FIG. 5 depicts the receiving part 408 presented in FIG. 4 as seen from the direction of the upper surface 428. The upper surface is smooth and continuous and has no protrusions. When the connection arrangement is in use, the upper surface faces upward. The edges of the receiving part at the first end 414 of the receiving part and at the second end 415 of the receiving part are rounded. The roundness and smoothness of the surface improve safety as there are no sharp edges or other parts that could cause injury if, for example, a toe or a foot hits the securing piece of the connection arrangement. The opening 429 is on the underside of the securing piece when the connection arrangement is in use, so there is no danger of accidental detachment of the loop.

Figure 6:
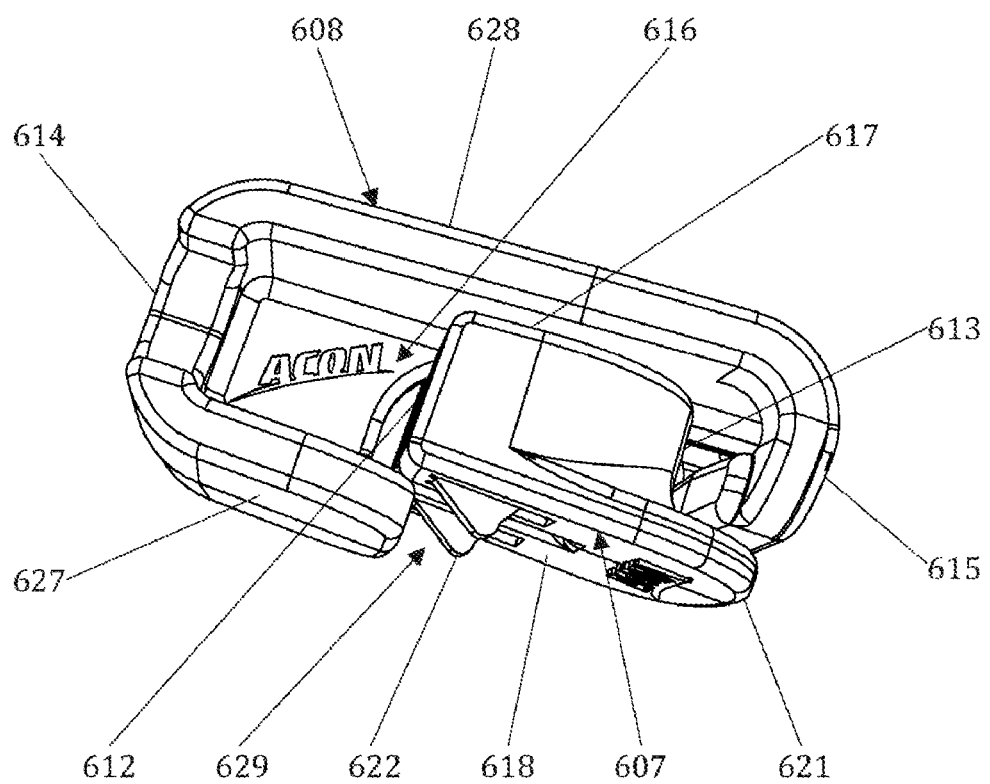
FIG. 6 depicts an example of a cord holding part and a receiving part according to an embodiment.

FIG. 6 depicts an example of a cord holding part 607 and a receiving part 608 according to an embodiment. The parts are in the process of being joined to form a securing piece in a connection arrangement.

The cord holding part 607 comprises a first end 612 of the cord holding part, a second end 613 of the cord holding part, a first surface 617 and a second surface 618. The cord holding part further comprises a clamping arrangement 622 and a lip extension 621. The cord holding part is configured to hold a cord by both ends of the cord, thus forming a loop. For the sake of the clarity, the cord is left out of this figure.

The receiving part 608 comprises a first end 614 of the receiving part, a second end 615 of the receiving part, an upper surface 628, a bottom surface 627, an opening 629 having edges, a receiving space 616 for receiving the cord holding part 607 and the sides of the receiving part, which sides are open toward the receiving space.

The cord holding part 607 is inserted through the opening 629 into the receiving space 616 in such a way that the first end 612 of the cord holding part is toward the first end 614 of the receiving part, and the second end 613 of the cord holding part is toward the second end 615 of the receiving part. The first surface 617 and the second surface 618 are configured in such a way that when the cord holding part is pushed toward the first end of the receiving part to the extent that the first end 612 of the cord holding part is in touch with the end wall of the receiving space (i.e. the wall nearest to the first end of the receiving part), the cord holding part fits between the upper surface 628 and the bottom surface 627.

Figure 7:
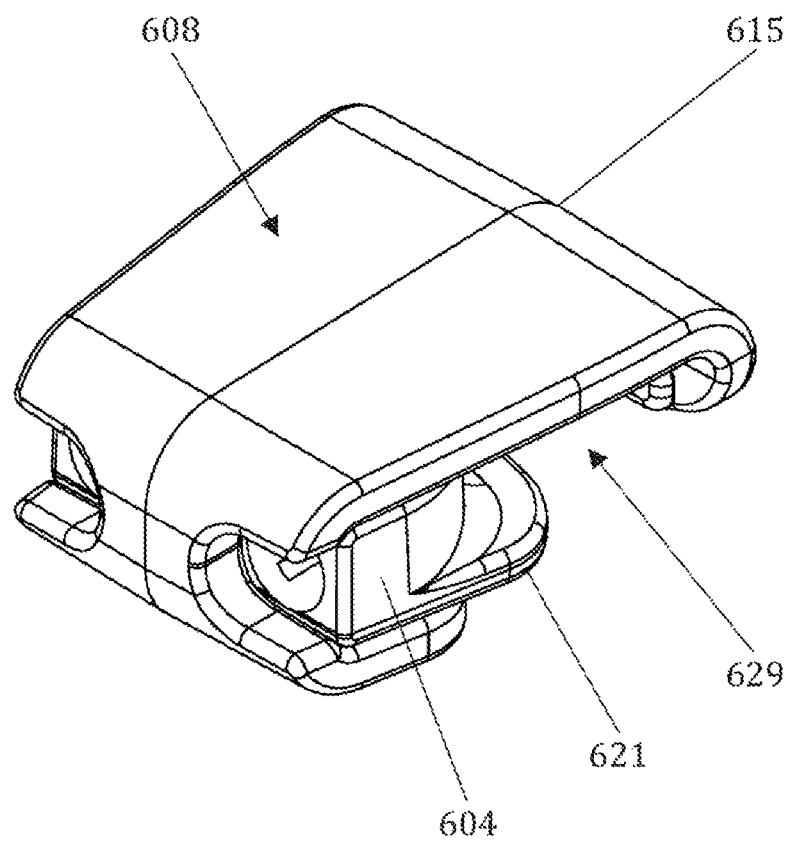
FIG. 7 depicts the cord holding part and the receiving part presented in FIG. 6.

FIG. 7 depicts the cord holding part 607 and the receiving part 608 presented in FIG. 6 as connected to the securing piece 706. The cord holding part and the opening 629 are configured in such a way that the lip extension 621 extends into the opening and thus makes the opening narrower, i.e. the distance between the second end 615 of the receiving part (or a second edge of the opening) and the lip extension is shorter than the distance between the edges of the opening. The cord (i.e. the loop) can be placed to go through the opening on the lip extension. This improves the hold of the cord further supported by the side of the cord holding part 604 and at the same time allows for a wider opening, simplifying the assembly process.

Figure 8:
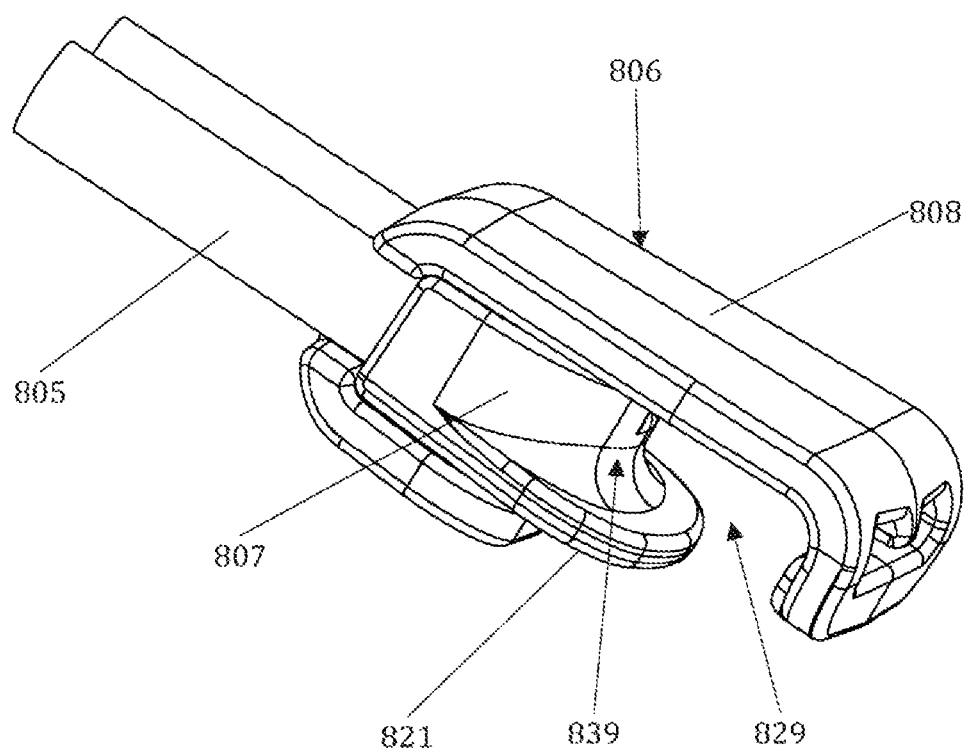
FIG. 8 depicts a second example of a connection arrangement according to an embodiment.

FIG. 8 depicts a second example of a connection arrangement 804 according to an embodiment. The connection arrangement comprises a cord 805 and a security piece 806. The security piece serves to secure the mat of the trampoline to the frame and for holding the cord, which provides the bouncing properties of the mat. The security piece comprises a receiving part 808 and a cord holding part 807. The cord holding part is configured to receive both ends of the cord and thus forming a loop that comprises the cord and the cord holding part. The receiving part is configured to receive the cord holding part and one end of the loop through an opening 829. The loop is configured to wrap around some horizontal part of the frame of the trampoline when the connection arrangement is connected to the frame. In FIG. 8 the cord holding part that contains the ends of the cord is placed inside the receiving part through the opening. In this embodiment, the cord holding part comprises a lip extension 821, which extends into the opening and forms a groove 839 between the lip extension and a surface above the lip extension. When the connection arrangement is about to be fitted onto the frame of the trampoline, the end of the loop that is to the opposite the cord holding part, is turned or wrapped around the frame. Then the end of the loop is run trough the opening and placed inside the groove. The pull of the cord keeps the parts of the security piece tightly interlocked and prevents any movement in relation to each other. The security piece thus behaves like a solid object.

Some advantageous embodiments of the device according to the invention have been described above. The invention is however not limited to the embodiments described above, but the inventive idea can be applied in numerous ways within the scope of the claims.

The invention claimed is:

1. A connection arrangement for a trampoline comprising a mat and a frame, the connection arrangement configured to connect to the mat to the frame, the connection arrangement comprising:
an elastic cord having a first end of the cord and a second end of the cord, and
a cord holding part and a receiving part wherein:
the cord holding part comprises a first end of the cord holding part, a second end of the cord holding part, a first surface and a second surface and sides of the cord holding part,
the receiving part comprises a first end of the receiving part a second end of the receiving part, an upper surface, a bottom surface, a receiving space configured to receive the cord holding part, and sides of the receiving part, which sides are open to the receiving space,
on the bottom surface is an opening to the receiving space and the opening is configured to extend from the second end of the receiving part toward the first end of the receiving part,
the cord holding part further comprises a first hole and a second hole the holes configured to extend from the first end of the cord holding part toward the second end of the cord holding part,
the elastic cord is configured such that the first end of the cord is arranged inside or to go through the first hole and the second end of the cord is arranged inside or to go through the second hole and the rest of the cord forms a loop on the first side of the cord holding part,
the receiving space is configured to extend over the bottom surface, and the cord holding part is configured to slide at least partly over the bottom surface in such a way that the first end of the cord holding part is arranged towards the first end of the receiving part, the first surface is arranged towards the upper surface, the second surface is arranged towards the bottom surface and the receiving space is further configured to accommodate the cord therein, and
wherein when the connection arrangement is in use, one end of the loop is configured to wrap around the frame and placed inside the receiving space.

2. The connection arrangement according to claim 1, wherein the opening is configured to extend from one side of the receiving part to an other side of the receiving part.

3. The connection arrangement according to claim 1 wherein when the connection arrangement is in use, the upper surface is arranged facing upward and the bottom surface is arranged facing downward in relation to the trampoline.

4. The connection arrangement to claim 1, wherein the length of the opening in the direction of the longitudinal axis of the receiving part in the direction from the first end of the receiving part to the second end of the receiving part, is equal to the length of the cord holding part from the first end of the cord holding part to the second end of the cord holding part or more.

5. The connection arrangement to claim 1, wherein the receiving space on an opposite side of the opening comprises a guidance wall arranged parallel to the longitudinal axis of the receiving part, and the cord holding part comprises a guidance groove configured to receive the guidance wall when the cord holding part is in the receiving space.

6. The connection arrangement according to claim 1, further comprising:
a wall-like stability element arranged between the bottom surface and the upper surface at the first end of the receiving part or near it, the wall-like stability element arranged parallel to the longitudinal axis of the receiving part, and
a stability groove is arranged in the first end of the cord holding part extending from the first surface of the cord holding part to the second surface of the cord holding part, the stability element being configured to fit into the stability groove.

7. The connection arrangement according to claim 1, further comprising a first cord recess and a second cord recess arranged in the first end of the receiving part, and wherein the first cord recess is open to one side of the receiving part and the second cord recess is open to an other side of the receiving part, and when the connection arrangement is in use, parts of the cord are accommodated inside the recesses.

8. The connection arrangement according to claim 1, further comprising a flat lip extension arranged on the second surface of the cord holding part at the second end of the cord holding part, the flat lip extension configured to form a groove between the lip extension and the upper surface when the connection arrangement is in use.

9. The connection arrangement according to claim 1, wherein the cord holding part further comprise a first clamping arrangement and a second clamping arrangement, and the clamping arrangements are configured to clamp the cord in the first hole and in the second hole when the connection arrangement is in use.

10. The connection arrangement according to claim 9, wherein the first clamping arrangement and the second clamping arrangement comprise extensions on the first surface of the cord holding part and on the second surface of the cord holding part, and when the cord holding part is at least partly located between the bottom surface and the upper surface, the surfaces press against the extensions inside the cord holding part, thus increasing the hold on the cord inside the holes.

11. The connection arrangement, according to claim 1, wherein the thickness of the first end of the cord holding part is less than the thickness of the second end of the cord holding part.

12. The connection according to claim 1, wherein the first end of the receiving part is higher than the second end of the receiving part.

13. The connection according to claim 1, wherein the second end of the receiving part is an arrangement for fixing the mat to the receiving part.

14. The connection arrangement according to claim 1, wherein the second end of the receiving part is wider than the first end of the receiving part.

15. A trampoline comprising:
a mat,
a frame, and a connection arrangement configured to connect the mat to the frame, the connection frame comprising
an elastic cord having a first end of the cord and a second end of the cord,
a cord holding part, and a receiving part, wherein:
the cord holding part comprises a first end of the cord holding part, a second end of the cord holding part, a first surface and a second surface and sides of the cord holding part,
the receiving part comprises a first end of the receiving part, a second end of the receiving part, an upper surface, a bottom surface, a receiving space configured to receive the cord holding part and the sides of the receiving part, which sides are open to the receiving space,
on the bottom surface is an opening to the receiving space and the opening is configured to extend from the second end of the receiving part toward the first end of the receiving part, and
the cord holding part further comprises a first hole and a second hole, the holes configured to extend from the first end of the cord holding part toward the second end of the cord holding part.

* * * * *